United States Patent
Fujii et al.

(10) Patent No.: US 11,673,178 B2
(45) Date of Patent: Jun. 13, 2023

(54) ADJUSTMENT DEVICE OF PUNCHING DEVICE AND ADJUSTMENT METHOD OF PUNCHING DEVICE

(71) Applicant: Panasonic Intellectual Property Management Co., Ltd., Osaka (JP)

(72) Inventors: Keitaro Fujii, Osaka (JP); Masayuki Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 142 days.

(21) Appl. No.: 17/158,063

(22) Filed: Jan. 26, 2021

(65) Prior Publication Data

US 2021/0237141 A1 Aug. 5, 2021

(30) Foreign Application Priority Data

Feb. 4, 2020 (JP) .............................. JP2020-017287

(51) Int. Cl.
*B21D 37/14* (2006.01)
*B21D 28/34* (2006.01)
*B21D 28/14* (2006.01)
*B23Q 3/155* (2006.01)

(52) U.S. Cl.
CPC .............. *B21D 37/14* (2013.01); *B21D 28/14* (2013.01); *B21D 28/34* (2013.01); *B23Q 3/15573* (2013.01)

(58) Field of Classification Search
CPC ........ B21D 37/04; B21D 37/06; B21D 37/08; B21D 37/10–12; B21D 28/14–22; B21D 28/24–26
See application file for complete search history.

(56) References Cited

U.S. PATENT DOCUMENTS 3,150,550 A * 9/1964 Berlin .................. B21D 37/205
83/13
3,908,500 A * 9/1975 Gargrave ............... B21D 37/14
83/563

(Continued)

FOREIGN PATENT DOCUMENTS

JP 2001-062526 3/2001
JP 2002-346658 12/2002

(Continued)

*Primary Examiner* — Adam J Eiseman
*Assistant Examiner* — Richard D Crosby, Jr.
(74) *Attorney, Agent, or Firm* — Wenderoth, Lind & Ponack, L.L.P.

(57) ABSTRACT

An adjustment device of a punching device punches a workpiece on a die so that the workpiece is punched into a predetermined shape. The adjustment device includes a first drive mechanism that moves the punch or the die in a direction orthogonal to a punching direction, and a controller connected to the first drive mechanism. The controller brings the punch and the die into contact with each other by moving the punch or the die in four orthogonal directions in a plane perpendicular to the punching direction from an initial position where the punch is inserted into the punching die. The controller causes the first drive mechanism to move the punch or the die to a center position where a central axis of the punch and a central axis of the die are aligned with other.

1 Claim, 10 Drawing Sheets

(56) References Cited

U.S. PATENT DOCUMENTS

| | | | | |
|---|---|---|---|---|
| 3,969,928 | A * | 7/1976 | Zarka | G01N 3/42 |
| | | | | 73/806 |
| 4,945,752 | A * | 8/1990 | Stursberg | B21D 37/14 |
| | | | | 72/472 |
| 5,839,336 | A * | 11/1998 | Yamauchi | B26F 1/14 |
| | | | | 83/167 |
| 6,357,329 | B1 * | 3/2002 | Sakamoto | B21D 28/12 |
| | | | | 83/556 |
| 8,234,897 | B2 * | 8/2012 | Kuwayama | B21D 37/00 |
| | | | | 72/21.4 |
| 10,500,765 | B2 * | 12/2019 | Aitharaju | B29C 33/22 |
| 2010/0329755 | A1 * | 12/2010 | Obuchi | B26F 1/14 |
| | | | | 399/361 |
| 2015/0185094 | A1 * | 7/2015 | Kohler | G01L 1/16 |
| | | | | 73/774 |
| 2016/0193747 | A1 * | 7/2016 | Greenleaf | B26D 7/26 |
| | | | | 29/450 |
| 2018/0147617 | A1 * | 5/2018 | Villeneuve | B21D 37/14 |
| 2021/0078062 | A1 * | 3/2021 | Takahashi | G01L 5/0071 |

FOREIGN PATENT DOCUMENTS

| | | |
|---|---|---|
| JP | 3375094 B | 2/2003 |
| JP | 2003-126928 | 5/2003 |

* cited by examiner

ADJUSTMENT DEVICE OF PUNCHING DEVICE AND ADJUSTMENT METHOD OF PUNCHING DEVICE

BACKGROUND

1. Technical Field

The present disclosure relates to an adjustment device of a punching device and an adjustment method of a punching device, and particularly relates to adjustment of a punching press die.

2. Description of the Related Art

Punching press work is generally a technique for obtaining a predetermined shape of a workpiece as follows. While the workpiece placed on a die is pressed by a stripper, the workpiece is pushed into the die and punched by a punch. In general, the punching press work is widely used in various fields such as home appliances, precision instruments, or automobile components.

In the punching press work, a clearance between the die serving as a pressing die and punch is an important parameter that greatly affects quality (burr or surface roughness) of the workpiece, and it is known that a proper amount thereof is generally 6% to 10% of a thickness of the workpiece. When respective centers of the punch and die do not coincide with each other, a tool may be unevenly worn, and a life of the tool may be shortened in some cases. For example, when a thin material having the thickness of 30 μm is punched, the proper amount of the clearance approximately 2 μm, and thus, a tool position needs to be precisely adjusted.

In the related art, as an adjustment method of the tool position, there is a method of manually hitting the die with a hammer or a method of cutting the die. However, a highly-skilled level of a worker is required. Therefore, for example, as disclosed in Japanese Patent No. 3375094, there is an example of a centering device of the pressing die.

SUMMARY

However, in the centering device according to Japanese Patent No. 3375094, a positional relationship between the punch and the die is quantitatively unknown. Consequently, it is not possible to determine that the center of the punch and the center of the die coincide with each other. In addition, as a tool fixing method in the centering device, the tool is fastened by a nut. However, the nut is loosened due to vibrations during the work, and the tool position varies. Therefore, know-how is required to center the clearance between the punch and the die, and there is a possibility that the clearance may be eccentric during the pressing work.

In view of the above-described problems in the related art, the present disclosure aims to improve accuracy in adjusting relative positions of a punch and a die.

According to an aspect of the present disclosure, in order to achieve the above object, there is provided an adjustment device of a punching device which punches a workpiece placed on a die having a punching die with a punch so that the workpiece is punched into a predetermined shape. The adjustment device includes a first drive mechanism that moves the punch or the die in a direction orthogonal to a punching direction, and a controller connected to the first drive mechanism in a communicable manner. The controller causes the first drive mechanism to bring the punch and the die into contact with each other by moving the punch or the die in four orthogonal directions in a plane perpendicular to the punching direction from an initial position where the punch is inserted into the punching die. Based on a distance between the initial position and each contact position in the four directions, the controller causes the first drive mechanism to move the punch or the die to a relatively center position between the punch and the die.

In addition, according to another aspect of the present disclosure, there is provided an adjustment method of a punching device which punches a workpiece placed on a die having a punching die with a punch so that the workpiece is punched into a predetermined shape. The adjustment method includes causing a controller to bring the punch and the die into contact with each other by moving the punch or the die in four orthogonal directions in a plane perpendicular to a punching direction from an initial position where the punch is inserted into the punching die, and causing the controller to move the punch or the die to a center position of the punching die, based on a distance between the initial position and each contact position in the four directions.

As described above, according to the adjustment device of the punching device and the adjustment method of the punching device of the present disclosure, it is possible to realize improved accuracy in adjusting relative positions of the punch and the die.

DETAILED DESCRIPTIONS

Exemplary Embodiment 1

Figure 1A:
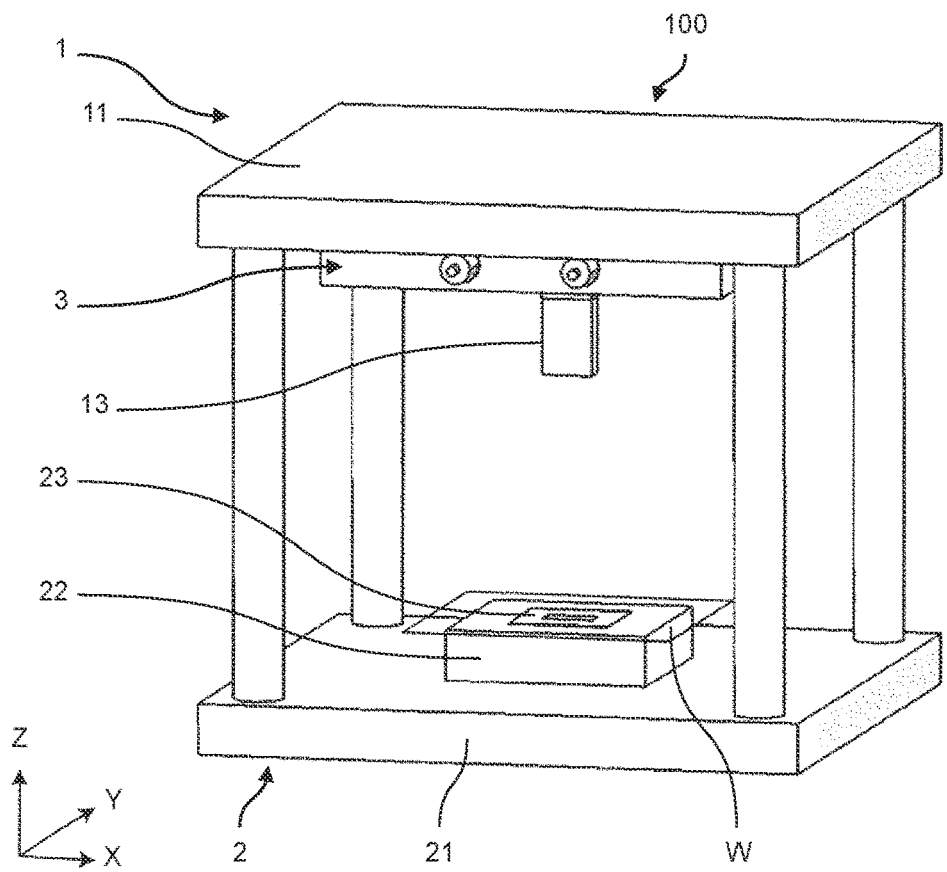
FIG. 1A is a schematic view illustrating a whole punching device according to Exemplary Embodiment 1 of the present disclosure.
Figure 1B:
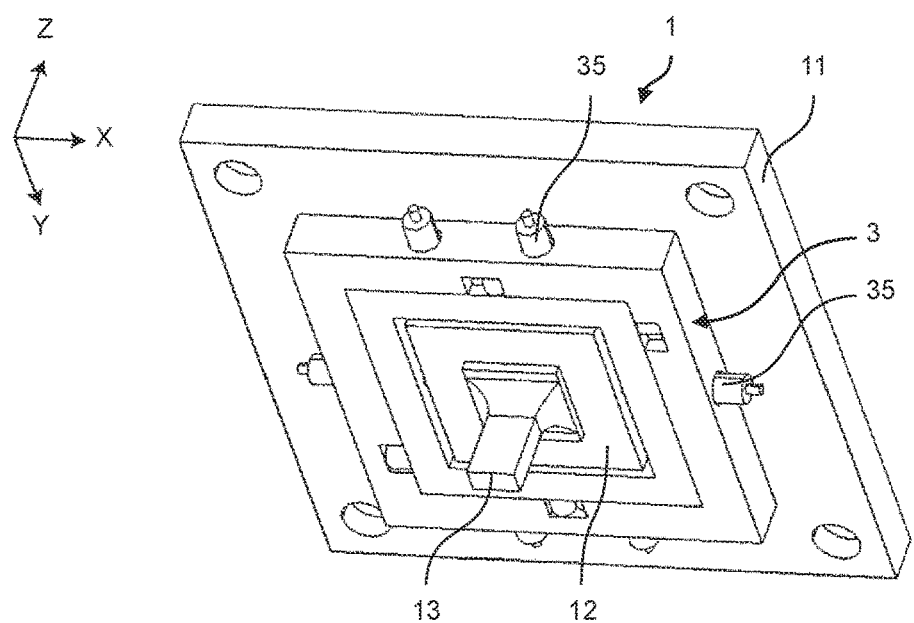
FIG. 1B is a perspective view of an upper die of the punching device according to Exemplary Embodiment 1 of the present disclosure.
Figure 2A:
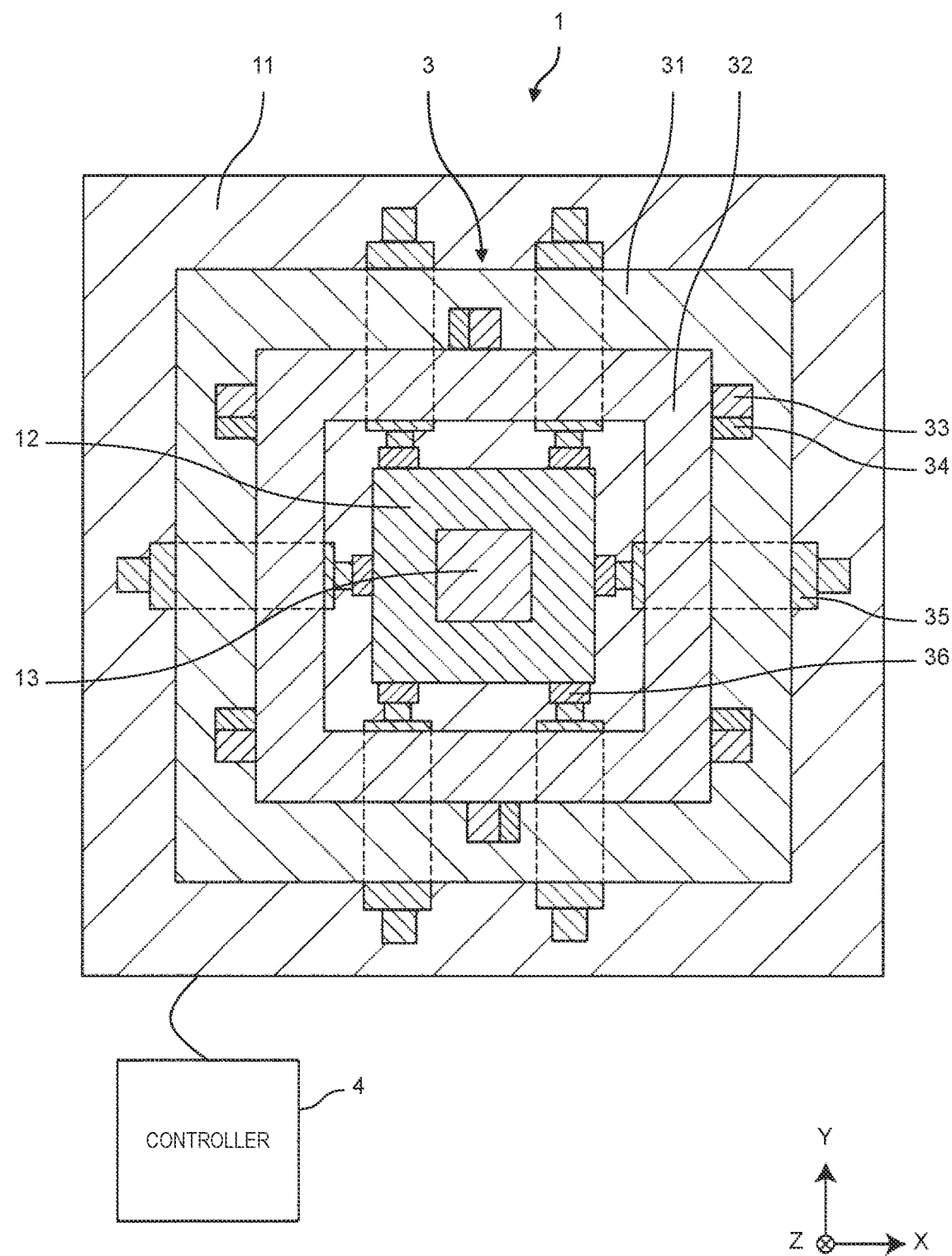
FIG. 2A is a schematic view illustrating a configuration of an adjustment device according to Exemplary Embodiment 1 of the present disclosure.
Figure 2B:
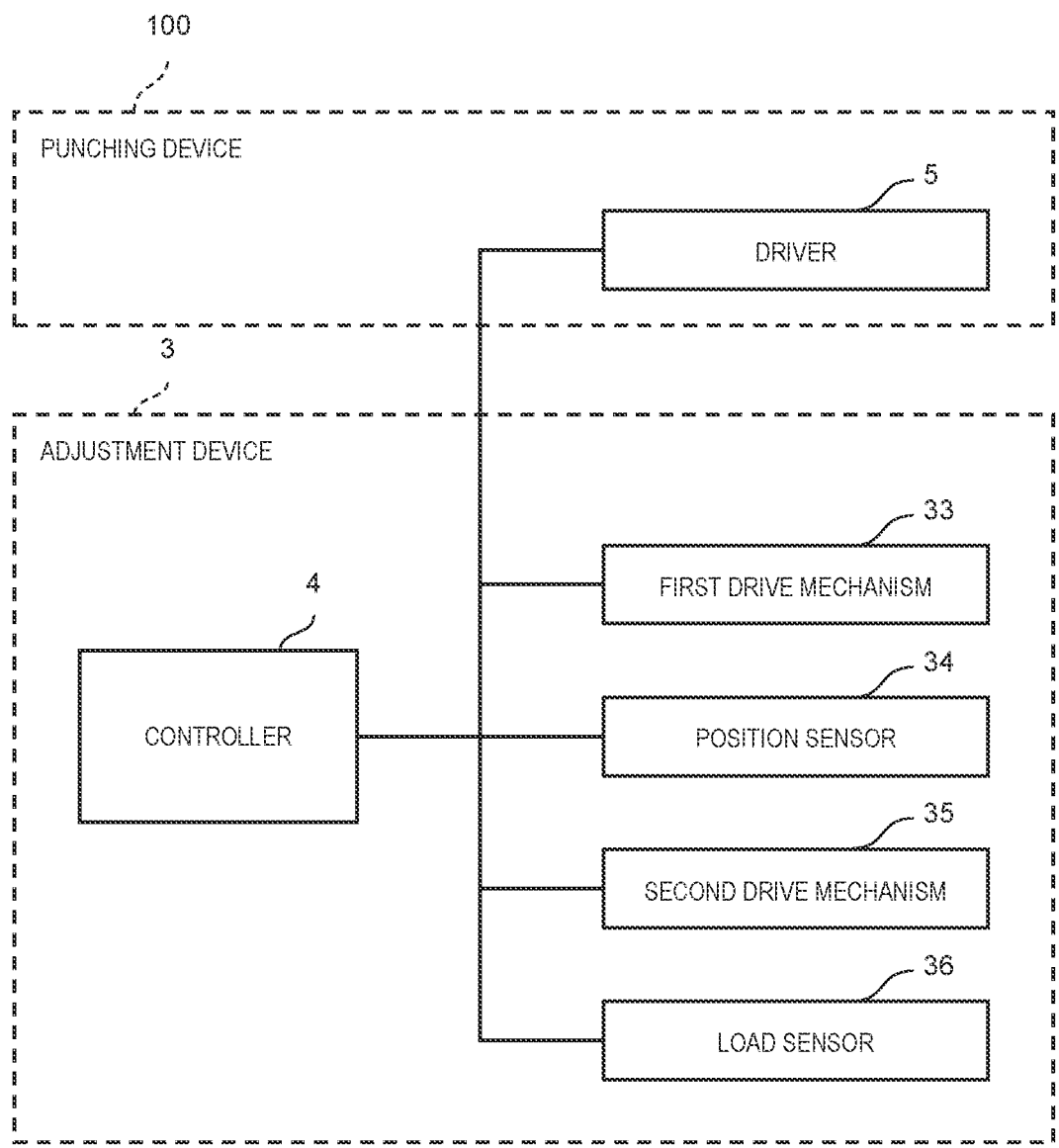
FIG. 2B is a block diagram illustrating a configuration of the adjustment device according to Exemplary Embodiment 1 of the present disclosure.

Hereinafter, Exemplary Embodiment 1 of the present disclosure will be described with reference to FIGS. 1 to 4G. FIG. 1A illustrates a schematic view illustrating a whole punching device 100 according to Exemplary Embodiment 1 of the present disclosure. FIG. 1B illustrates a perspective view of upper die 1 of punching device 100 according to Exemplary Embodiment 1 of the present disclosure. FIG. 2A illustrates a schematic view illustrating a configuration of adjustment device 3 according to Exemplary Embodiment 1 of the present disclosure. FIG. 2B illustrates a block diagram illustrating a configuration of adjustment device 3 according to Exemplary Embodiment 1 of the present disclosure. For convenience of the following description, an XYZ Cartesian coordinate system illustrated in the drawing is adopted.

Punching device 100 is a work device including upper die 1 and lower die 2 as dies. Upper die 1 includes punch base 11, punch holder 12, and punch 13. Lower die 2 includes die base 21, die holder 22, and die 23. Upper die 1 is raised and lowered with respect to lower die 2 by driver 5 (refer to FIG. 2B). Punch 13 held in punch base 11 by punch holder 12 in upper die 1 punches workpiece W pressed by a stripper on die 23 with respect to die 23 held in die base 21 by die holder 22 in lower die 2. In this manner, a workpiece having a predetermined shape can be obtained.

Adjustment device 3 adjusts at least one of upper die 1 and lower die 2. When adjustment device 3 is installed in upper die 1, adjustment device 3 is attached to punch base 11 to surround a side surface of punch holder 12. When adjustment device 3 is installed in lower die 2, adjustment device 3 is attached to die base 21 to surround a side surface of die holder 22. The die is adjusted in such a way that adjustment device 3 moves punch holder 12 or die holder 22 to a designated position.

Next, a configuration of adjustment device 3 will be described in detail with reference to FIG. 2A.

Adjustment device 3 is configured to include first drive base 31 including first drive mechanism 33 and position sensor 34, second drive base 32 including second drive mechanism 35 having load sensor 36, and controller 4 connected to each of first drive mechanism 33 and second drive mechanism 35 in a communicable manner. Second drive mechanism 35 is used to fit punch 13 into die 23, and first drive mechanism 33 is used to move punch 13 inside die 23.

For example, first drive base 31 has a square frame shape having a hollow central portion. First drive base 31 includes at least four or more first drive mechanisms 33. First drive mechanism 33 is disposed along four orthogonal directions in a plane perpendicular to a punching direction. First drive mechanisms 33 provided on respective sides of first drive base 31 are respectively driven so that second drive base 32 provided inside first drive base 31 performs translational and rotational motions. In this way, first drive mechanism 33 moves second drive mechanism 35 provided in second drive base 32. Accordingly, punch 13 or die 23 supported by second drive mechanism 35 can be moved in a direction orthogonal to the punching direction.

In this case, drive amounts of respective first drive mechanisms 33 are measured by position sensors 34 provided in the vicinity of first drive mechanisms 33 while the number of position sensors 34 is the same as the number of first drive mechanisms 33. For example, when an actuator mechanism using a piezoelectric element that can be driven at a pitch of a submicron unit is adopted as first drive mechanism 33, the die can be highly accurately adjusted. When a capacitance type sensor that requires a smaller space is adopted as position sensor 34, a size of adjustment device 3 can be reduced.

Out of the plurality of first drive mechanisms 33, at least two facing first drive mechanisms 33 may be offset in a direction orthogonal to a facing direction so that second drive base 32 performs translational and rotational motions. When an offset amount is large, torques required for the rotational motions decrease, and a rotation angle decreases. Accordingly, in view of the torques of first drive mechanism 33, the offset amount may be reduced so that the rotation angle is maximized.

When adjustment device 3 is installed in punch base 11 or die base 21, first drive base 31 is installed to be fixed to punch base 11 or die base 21. When first drive base 31 is fixed by using a firm fixing method such as screw tightening, when punch holder 12 or die holder 22 is fixed to each corresponding base by means such as screw tightening, it is possible to prevent a position of adjustment device 3 from varying.

For example, second drive base 32 has a square frame shape having a hollow central portion, and punch holder 12 or die holder 22 is fixed inside second drive base 32. Second drive base 32 includes at least four or more second drive mechanisms 35. For example, second drive mechanism 35 is an actuator. Second drive mechanism 35 is disposed along four orthogonal directions in a plane perpendicular to the punching direction, and moves punch 13 or die 23 in a direction orthogonal to the punching direction. Second drive mechanisms 35 provided on respective sides of second drive base 32 are driven. In this manner, punch holder 12 or die holder 22 existing inside second drive base 32 performs translational and rotational motions.

In this case, load sensor 36 provided in second drive mechanism 35 measures a load acting on punch 13 or die 23 via fixed punch holder 12 or fixed die holder 22.

Load sensor 36 does not necessarily have to be provided in second drive mechanism 35, and may be provided in punch holder 12 or die holder 22, for example. In addition, as long as there is a method of detecting contact between punch 13 and die 23, load sensor 36 may not be provided. For example, a form may be adopted in which punch 13 and die 23 include an electric conduction sensor. In a case where load sensor 36 is provided, when rough adjustment (to be described later) is performed, an adjustment direction of punch 13 or die 23 can be calculated.

In order that tools such as punch 13 and die 23 perform translational and rotational motions, it is desirable that at least two facing second drive mechanisms 35 are offset in a direction orthogonal to a facing direction. When an offset amount is large, torques required for the rotational motions decrease, and a stroke decreases. Accordingly, in view of the torques of second drive mechanism 35, the offset amount may be reduced so that the stroke is maximized.

In order to prevent damage to each member when punch holder 12 or die holder 22 is fixed, a cushioning material such as a rubber material may be provided at a location where second drive mechanism 35 comes into contact with punch holder 12 or die holder 22.

When load sensor 36 has a function of resetting the load to a zero point, it is possible to easily detect contact of the tools (punch 13 and die 23).

Controller 4 receives position information and load information from each of position sensor 34 and load sensor 36, and transmits drive information to each of first drive mechanism 33 and second drive mechanism 35, based on calculation process results of the position information and the load information. Controller 4 is connected to driver 5 that raises and lowers upper die 1 in a communicable manner. Controller 4 can be realized by a semiconductor element. For example, controller 4 can be configured to include a microcomputer, a CPU, an MPU, a GPU, a DSP, an FPGA, and an ASIC. A function of controller 4 may be configured to include only hardware, or may be realized by combining hardware and software with each other. Controller 4 has a storage such as a hard disk (HDD), an SSD, and a memory, and realizes a predetermined function by reading data or a program stored in the storage and performing various calculation processes. Controller 4 may cause the storage to store the position information transmitted from position sensor 34 in order to calculate a tool center position.

Figure 3:
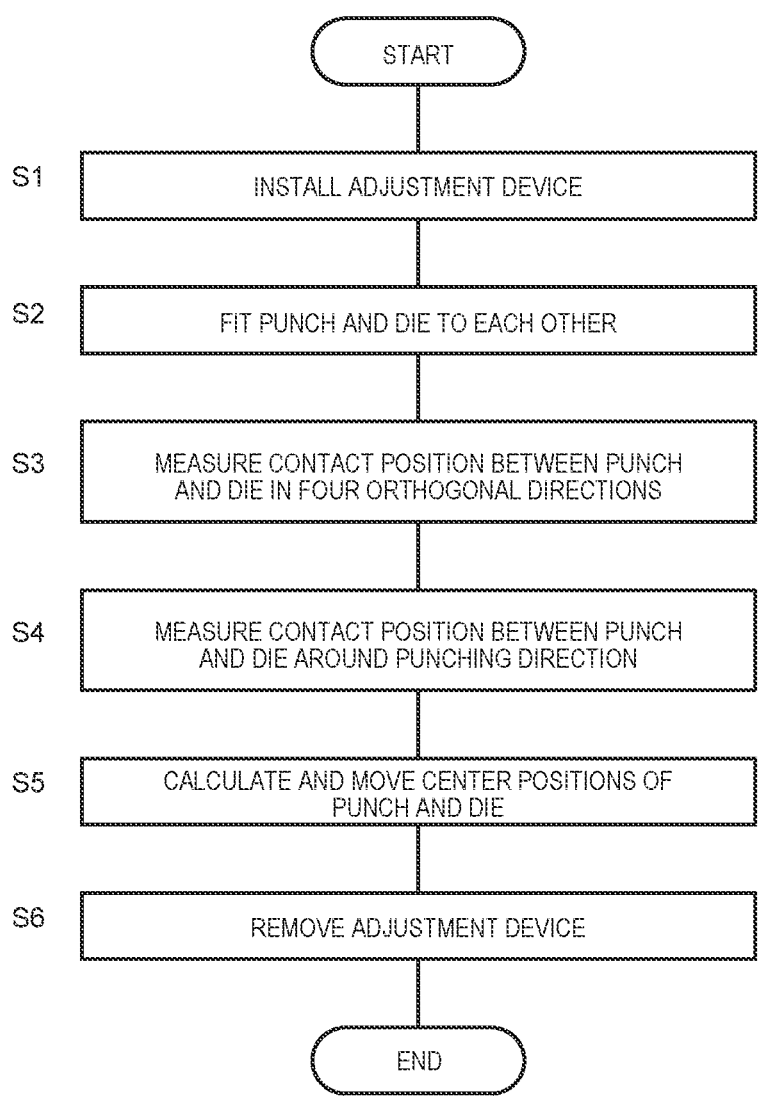
FIG. 3 is a flowchart illustrating an adjustment method in the adjustment device according to Exemplary Embodiment 1 of the present disclosure.

Next, an adjustment method of punching device 100 using adjustment device 3 will be described. FIG. 3 illustrates a flowchart illustrating the adjustment method in adjustment device 3 used in Exemplary Embodiment 1 of the present disclosure.

FIGS. 4A to 4G illustrate views for describing specific operations of the adjustment method in adjustment device 3 used in Exemplary Embodiment 1 of the present disclosure. FIG. 5 illustrates a view for describing a specific operation in Step S2 in the adjustment method used in Exemplary Embodiment 1 of the present disclosure.

Figure 4A:
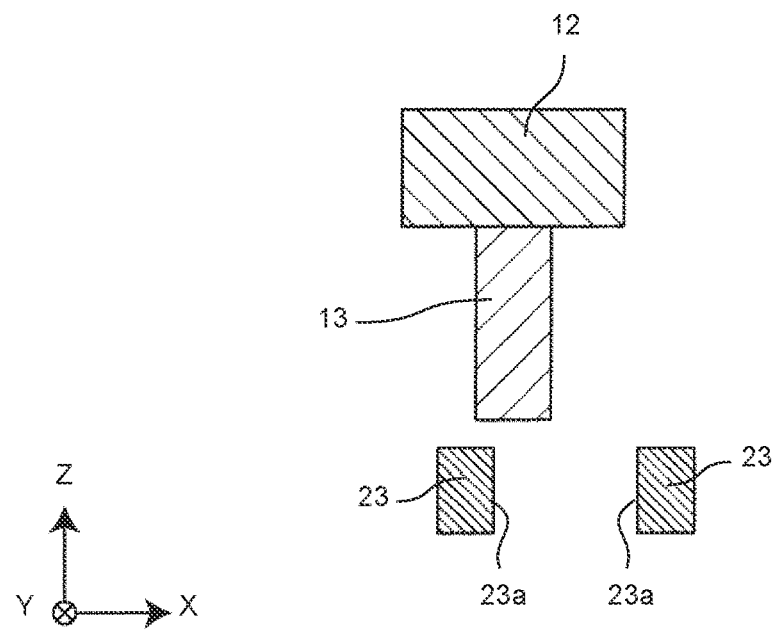
FIG. 4A is a view for describing a specific operation of the adjustment method in the adjustment device according to Exemplary Embodiment 1 of the present disclosure.

First, in Step S1 in FIG. 3, a worker installs adjustment device 3 in upper die 1 or lower die 2. At an initial stage of installing adjustment device 3, as illustrated in FIG. 4A, the initial state is a state where calibration of the tool is not completed, that is, a state where punch 13 is eccentric with respect to punching die 23a of die 23.

Figure 4B:
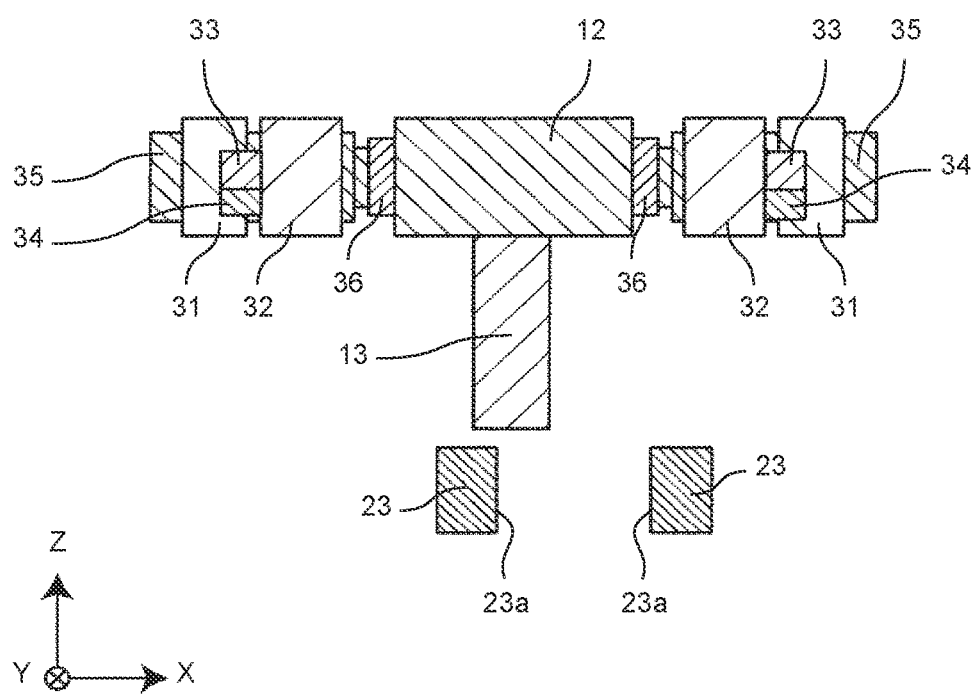
FIG. 4B is a view for describing a specific operation of the adjustment method in the adjustment device according to Exemplary Embodiment 1 of the present disclosure.

When adjustment device 3 is installed in upper die 1, as illustrated in FIG. 4B, adjustment device 3 is installed so that a side surface of punch holder 12 is surrounded and first drive base 31 is fixed to punch base 11. When adjustment device 3 is installed in lower die 2, adjustment device 3 is installed so that a side surface of die holder 22 is surrounded and first drive base 31 is fixed to die base 21. Punch holder 12 or die holder 22 is pinched and supported by at least two sets of second drive mechanisms 35 facing each other in an X-direction and a Y-direction. Then, punch holder 12 fixed to punch base 11 or die holder 22 fixed to die base 21 is loosened, thereby bringing punch holder 12 or die holder 22 into a state of being movable by first drive mechanism 33 and second drive mechanism 35.

Figure 4C:
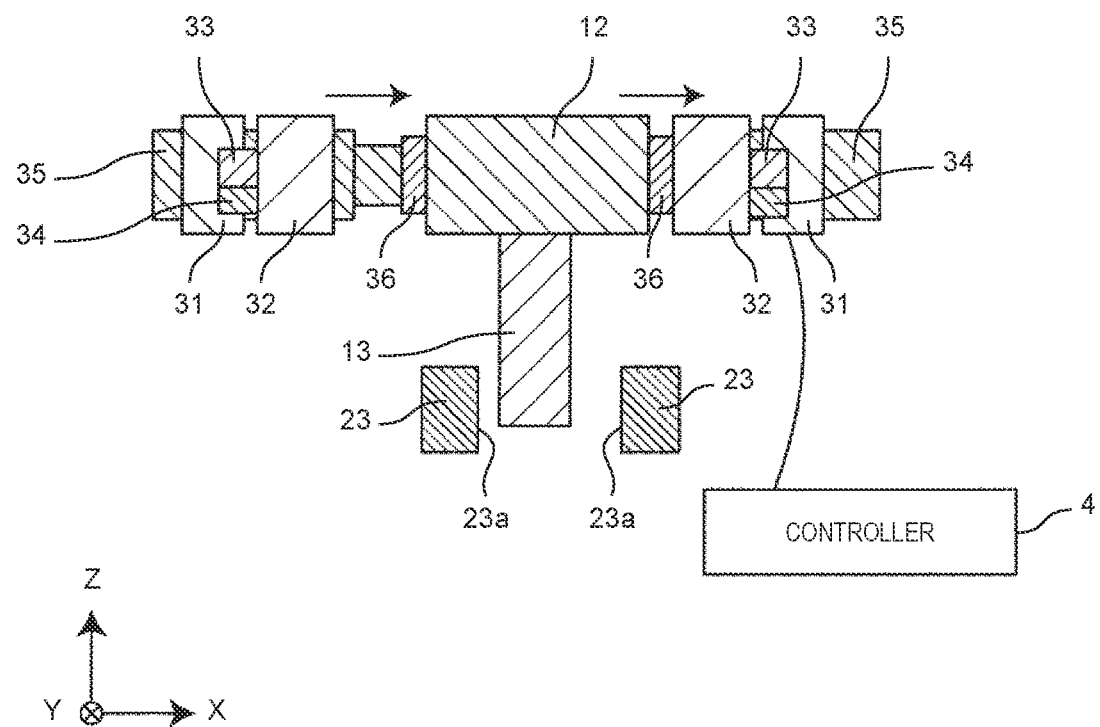
FIG. 4C is a view for describing a specific operation of the adjustment method in the adjustment device according to Exemplary Embodiment 1 of the present disclosure.

Subsequently, in Step S2 in FIG. 3, the tool position is roughly adjusted so that punch 13 and die 23 are fitted to each other (FIG. 4C).

Figure 5A:
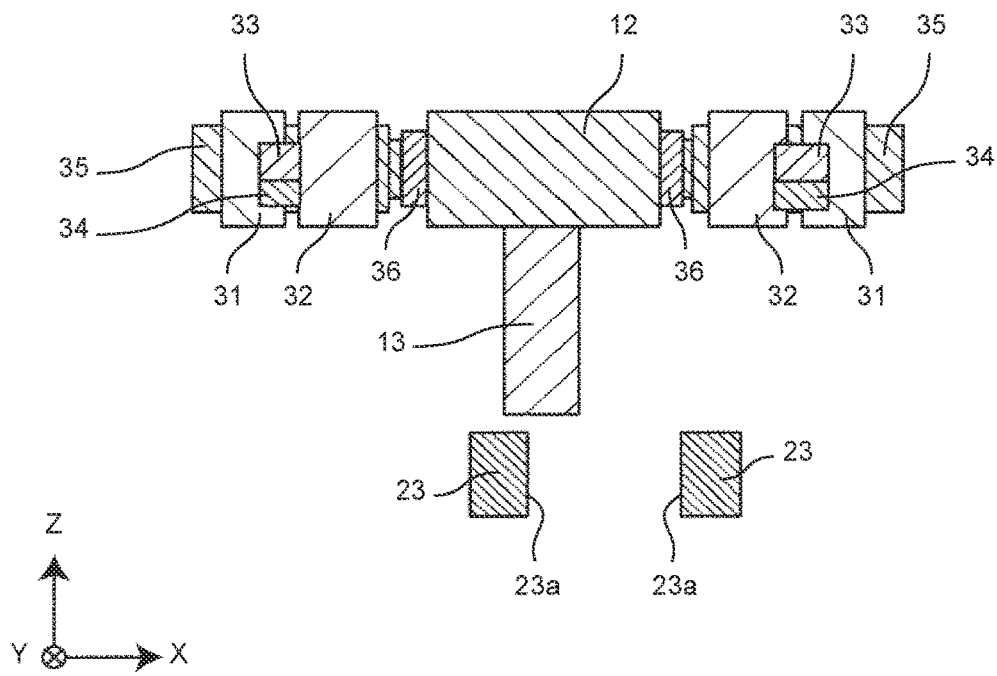
FIG. 5A is a view for describing a specific operation in Step S2 of the adjustment method in the adjustment device according to Exemplary Embodiment 1 of the present disclosure.

First, controller 4 drives second drive mechanism 35, moves punch 13 or die 23 on a plane perpendicular to the punching direction, and moves punch 13 or die 23 to the vicinity of the fitting position (FIG. 5A).

In this case, for example, when the center position at the time of the previous work is stored in controller 4, if the position of the tool (punch 13 or die 23) having no adjustment device 3 is not changed from that at the time of the previous work, the tool position having adjustment device 3 is moved to the center position at the time of the previous work. In this manner, the work in Step S2 below can be omitted.

When the contact between punch 13 and die 23 is detected by using load sensor 36, load sensor 36 is brought into a state where load sensor 36 can detect the contact between punch 13 and die 23 by resetting a zero point of the load.

Figure 5B:
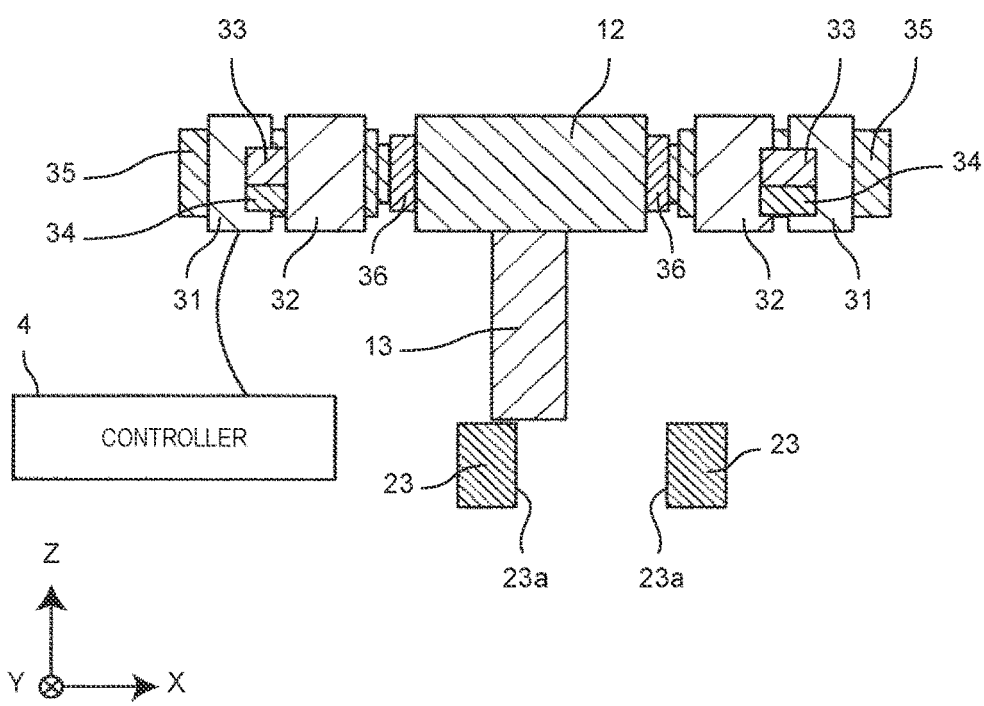
FIG. 5B is a view for describing a specific operation in Step S2 of the adjustment method in the adjustment device according to Exemplary Embodiment 1 of the present disclosure.

Thereafter, as illustrated in FIG. 5B, controller 4 drives driver 5 to lower upper die 1, and brings punch 13 and die 23 closer to each other. Next, controller 4 causes driver 5 to lower upper die 1 at a pitch of 10 μm or smaller, for example, in order to prevent tool damage during the contact in the vicinity of the contact position between punch 13 and die 23, and brings punch 13 and die 23 into contact with each other.

Then, load sensor 36 measures the load in the direction perpendicular to the punching direction at the time of the tool contact, which is generated when punch 13 and die 23 come into contact with each other. The load is generated in a direction of punching die 23a from the contact point between punch 13 and die 23. In FIG. 5B, for example, load sensor 36 detects a force of 2 N in the X-direction.

Next, controller 4 drives driver 5 to raise upper die 1 to a position where punch 13 and die 23 do not come into contact with each other. For example, controller 4 may determine that punch 13 and die 23 are no longer in contact with each other, based on a fact that the load is no longer detected by load sensor 36.

Figure 5C:
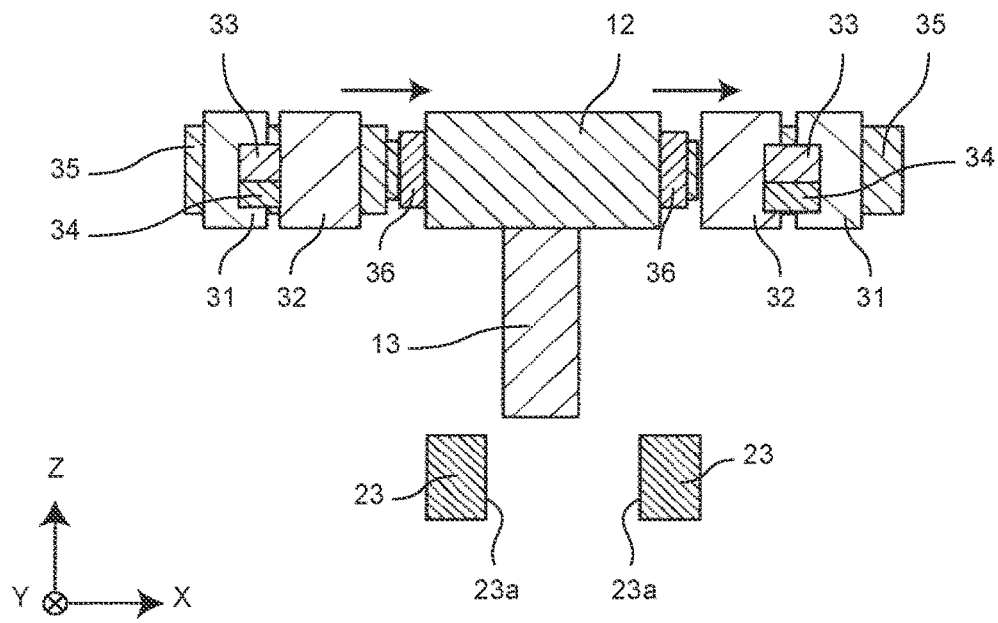
FIG. 5C is a view for describing a specific operation in Step S2 of the adjustment method in the adjustment device according to Exemplary Embodiment 1 of the present disclosure.

Next, controller 4 moves punch 13 or die 23 in a load direction measured when punch 13 and die 23 are brought into contact with each other by second drive mechanism 35 (FIG. 5C). In this case, for example, a movement amount of punch 13 or die 23 is 50% or smaller of a clearance on one side. In this way, controller 4 causes second drive mechanism 35 to move punch 13 or die 23 with a movement amount of 50% or smaller of a separation distance between punch 13 and die 23 at the center position. For example, a storage of controller 4 stores a clearance between punch 13 and die 23 in advance to calculate the movement amount of punch 13 or die 23. Alternatively, the movement amount may be set in advance by a user, and may be stored in the storage.

Figure 5D:
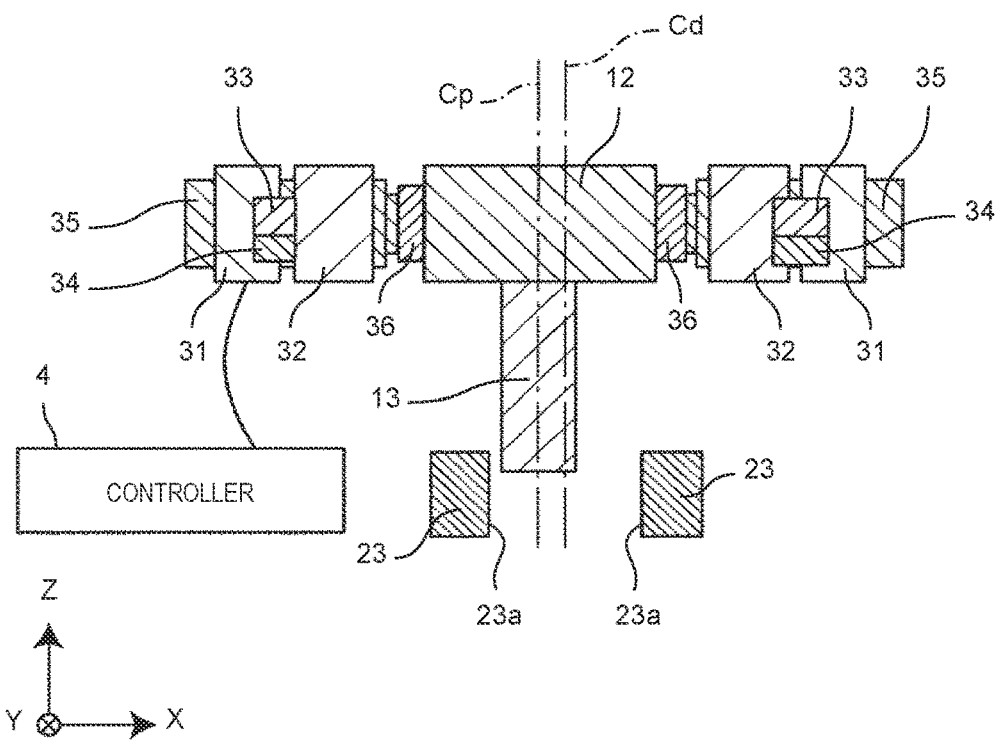
FIG. 5D is a view for describing a specific operation in Step S2 of the adjustment method in the adjustment device according to Exemplary Embodiment 1 of the present disclosure.

Controller 4 repeats a series of operations of load measurement and tool movement at the time of the above-described tool contact until the load at the time of the tool contact is no longer measured, that is, until the measurement value of the load measured by the load sensor reaches zero, and inserts punch 13 into punching die 23a of die 23. In FIG. 5D, the force detected by load sensor 36 is ON. In this case, the position of punch 13 or die 23 is set as the initial position, and a detection value of position sensor 34 is initialized. For example, as the initial position of the punch 13, 0 μm in the X-direction and 0 μm in the Y-direction, and as the rotation direction, 0 μrad in a θ-direction are stored in the storage of controller 4. At the initial position, the tools are in a rough adjustment stage. Accordingly, central axis Cp of punch 13 and central axis Cd of die 23 do not coincide with each other. In this way, controller 4 causes driver 5 to lower punch 13 from a position where punch 13 does not come into contact with die 23, and causes second drive mechanism 35 to move punch 13 to the initial position, based on presence or absence of a load generated when punch 13 and die 23 come into contact with each other.

According to the above-described operation, Step S2 in FIG. 3 is realized.

Subsequently, in Step S3 in FIG. 3, the tool contact position is measured when punch 13 or die 23 is moved in four orthogonal directions in a plane perpendicular to the punching direction.

Figure 4D:
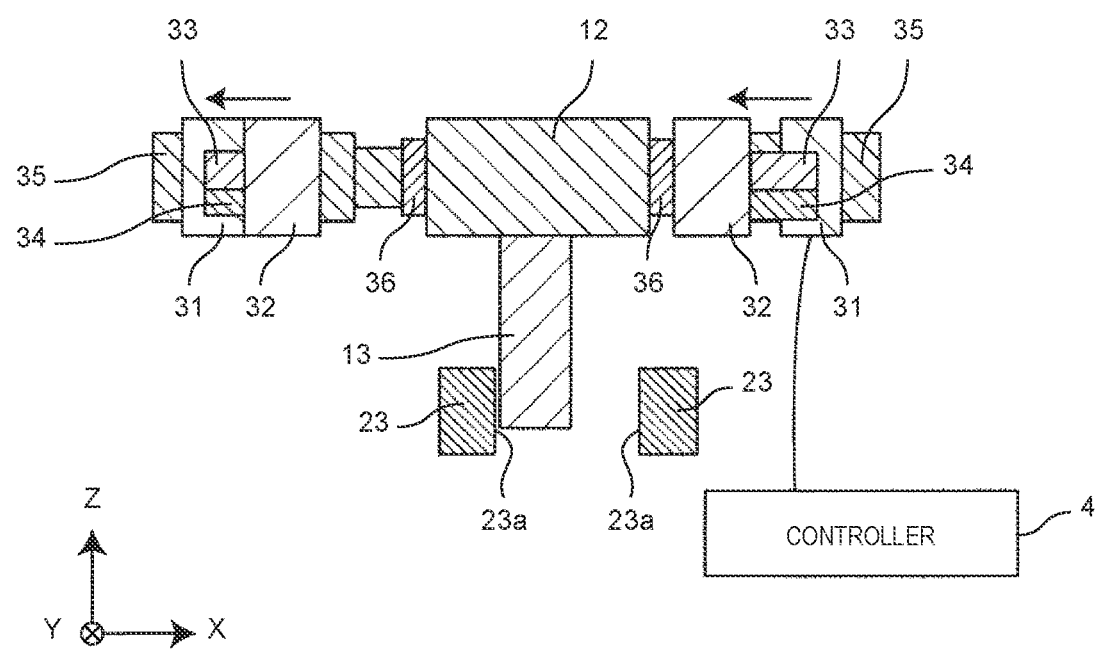
FIG. 4D is a view for describing a specific operation of the adjustment method in the adjustment device according to Exemplary Embodiment 1 of the present disclosure.

First, controller 4 causes first drive mechanism 33 to move punch 13 or die 23 in one direction of the four orthogonal directions in the plane perpendicular to the punching direction, until one of punch 13 and die 23 comes into contact with the other (FIG. 4D). Punch 13 or die 23 is moved at a pitch of 5 μm or smaller, for example, in order to prevent tool damage at the time of the tool contact. The position where punch 13 and die 23 come into contact with each other is stored in the storage of controller 4. In a state illustrated in FIG. 4D, the pitch is −3 μm in the X-direction, and when punching die 23a of die 23 comes into contact with the other, the pitch is 5 μm in the X-direction.

Then, position sensor 34 acquires position information (contact position information) at the time of contact between punch 13 and die 23, transmits the position information to controller 4, and controller 4 causes the storage to store the position information acquired by position sensor 34.

Thereafter, the same work is carried out in the remaining three directions of the four orthogonal directions in the plane perpendicular to the punching direction, and the position information at the time of the tool contact in each direction is acquired.

Subsequently, in Step S4 in FIG. 3, the tool contact position is measured when punch 13 or die 23 is rotated around the punching direction. When a cross-sectional shape of punch 13 is point-symmetrical with respect to the rotation center, Step S4 is omitted.

First, controller 4 causes first drive mechanism 33 to move punch 13 or die 23 to the vicinity of the contact position in any one direction, based on the tool contact position information in the four directions stored in Step S3. Due to a structure of first drive base 31, first drive mechanism 33 is less likely to secure a stroke for rotating punch 13 or die 23. Therefore, controller 4 may move punch 13 or die 23 within 1 μm from the contact position.

Figure 4E:
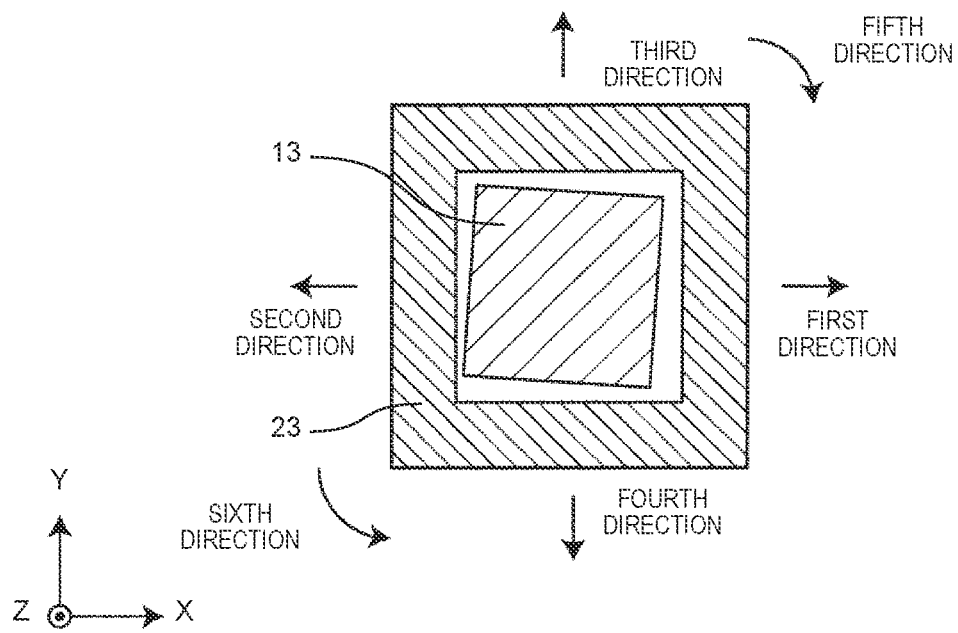
FIG. 4E is a view for describing a specific operation of the adjustment method in the adjustment device according to Exemplary Embodiment 1 of the present disclosure.

Thereafter, as illustrated in FIG. 4E, controller 4 causes first drive mechanism 33 to rotate punch 13 or die 23 in one direction around the punching direction, until punch 13 and die 23 come into contact with each other. Punch 13 or die 23 may be rotated at a pitch of 100 μrad or smaller, for example, in order to prevent tool damage at the time of contact between punch 13 and die 23.

For example, the rotation direction in one direction is a clockwise direction, and position sensor 34 acquires the position information by assuming that both are rotated at a pitch of −10 μrad and come into contact with each other. Then, position sensor 34 transmits the position information acquired at the time of contact between punch 13 and die 23 to controller 4, and controller 4 causes the storage to store the position information acquired by position sensor 34.

Next, the same work is carried out in a direction opposite to that in the above-described operation in the directions around the punching direction. First drive mechanism 33 rotates punch 13 or die 23 in a direction opposite to one direction around the punching direction, until the tools come into contact with each other. For example, position sensor 34 acquires the position information by assuming that both are rotated counterclockwise at a pitch of 18 μrad and come into contact with each other. Position sensor 34 transmits the position information acquired at the time of contact between punch 13 and die 23 to controller 4, and controller 4 causes the storage to store the position information acquired by position sensor 34.

Subsequently, in Step S5 in FIG. 3, based on the position information obtained in Step S3 and Step S4, controller 4 calculates the tool center position where central axis Cp of punch 13 and central axis Cd of die 23 are aligned with each other, and moves punch 13 or die 23 to the calculated tool center position. For example, the tool center position can be calculated as follows.

First, in the contact position information in the four directions obtained in Step S3, as illustrated in FIG. 4E, a contact position in a first direction which is one direction is defined as x1, a contact position in a second direction which is a direction opposite to the first direction is defined as x2, a contact position in a third direction which is a direction orthogonal to the first direction is defined as y1, and a contact position in a fourth direction which is a direction opposite to the third direction is defined to as y2. In addition, in the contact position information in the two directions obtained in Step S4, a rotation angle at a contact position in a fifth direction which is one direction is defined as θ1, and a rotation angle at a contact position in a sixth direction which is a direction opposite to the fifth direction is defined as θ2.

The tool center position (translational position: Cx, Cy, rotation position: Cθ) is calculated by Equation (1), Equation (2), and Equation (3) below, based on a distance between the initial position and each contact position in the four directions, the initial position, and the rotation amount in the two directions.

$$Cx=(x1+x2)/2 \quad \text{Equation (1)}$$

$$Cy=(y1+y2)/2 \quad \text{Equation (2)}$$

$$C\theta=(\theta1+\theta2)/2 \quad \text{Equation (3)}$$

Figure 4F:
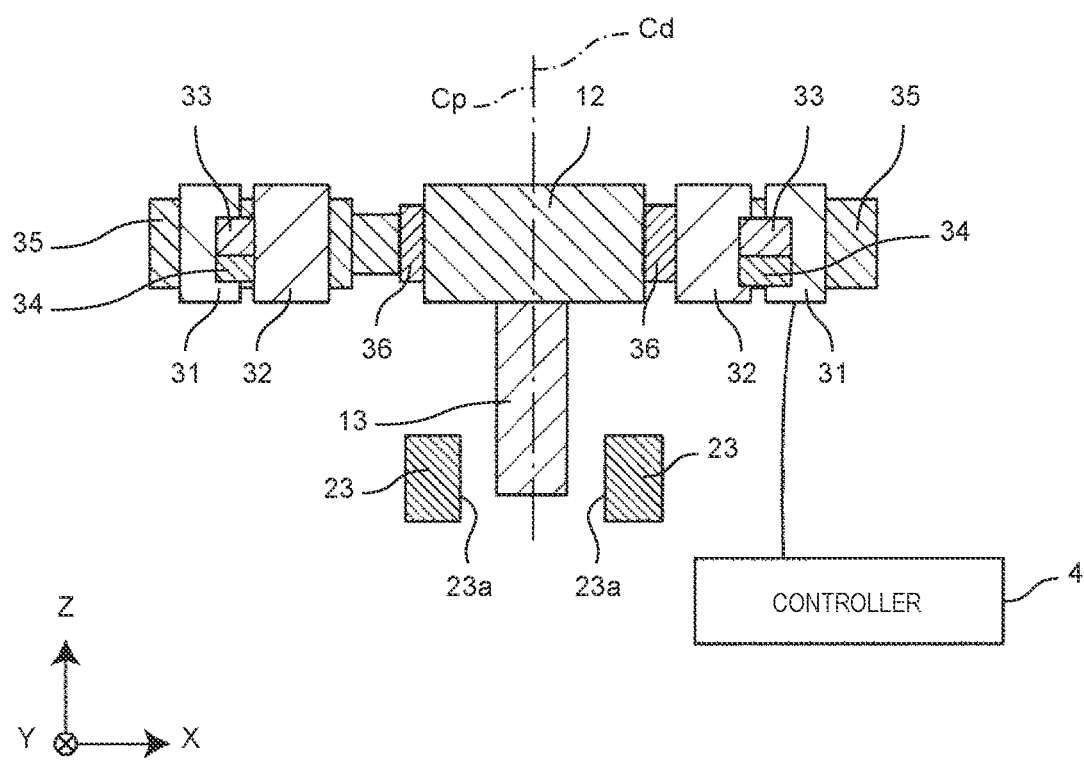
FIG. 4F is a view for describing a specific operation of the adjustment method in the adjustment device according to Exemplary Embodiment 1 of the present disclosure.

Thereafter, as illustrated in FIG. 4F, controller 4 drives and causes first drive mechanism 33 to move punch 13 or die 23 to tool center positions (Cx, Cy, and Cθ) where calculated central axis Cp of punch 13 and calculated central axis Cd of die 23 are aligned with each other. For example, the tool center position is 2 μm in the X-direction, 1 μm in the Y-direction, and 4 μrad in the θ-direction. When a cross-sectional shape of punch 13 is point-symmetrical with respect to the rotation center, the calculation of rotation position Cθ can be omitted.

Subsequently, in Step S6 in FIG. 3, a worker detaches adjustment device 3 from upper die 1 or lower die 2. First, the worker fixes punch holder 12 or die holder 22 fixed to second drive base 32 to punch base 11 or die base 21.

Figure 4G:
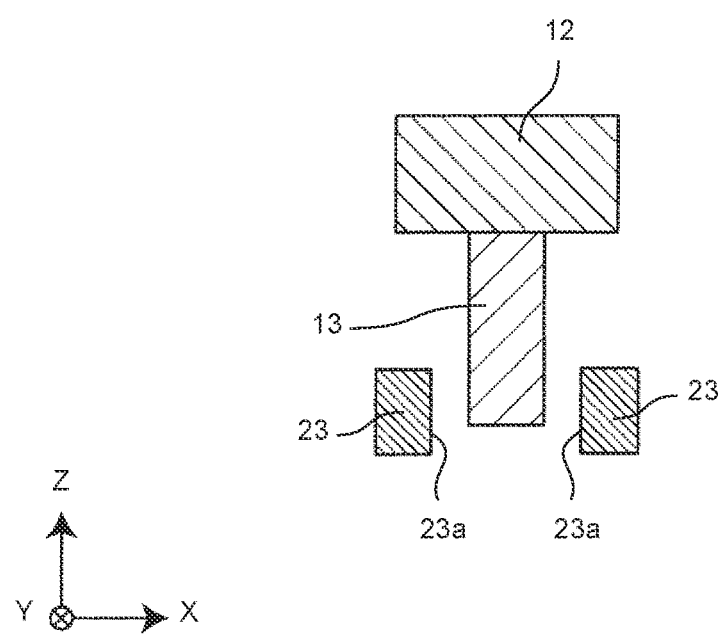
FIG. 4G is a view for describing a specific operation of the adjustment method in the adjustment device according to Exemplary Embodiment 1 of the present disclosure.

Thereafter, controller 4 unfixes punch holder 12 or die holder 22 from second drive base 32, and unfixes second drive base 32 from punch base 11 or die base 21, thereby detaching adjustment device 3 (refer to FIG. 4G).

When there are a plurality of combinations of punch 13 and die 23, Steps S1 to S6 described above are repeatedly performed on all of the combinations. In this manner, all of the tool positions can be adjusted by one adjustment device 3.

According to adjustment device 3 of punching device 100 of the present disclosure, adjustment device 3 of punching device 100 punches workpiece W into a predetermined shape by punching workpiece W placed on die 23 having punching die 23a with punch 13, and includes first drive mechanism 33 and controller 4. First drive mechanism 33 moves punch 13 or die 23 in the direction orthogonal to the punching direction, and controller 4 is connected to first drive mechanism 33 in a communicable manner. Controller 4 causes first drive mechanism 33 to move punch 13 or die 23 in the four orthogonal directions in the plane perpendicular to the punching direction from the initial position where punch 13 is inserted into punching die 23a, and brings punch 13 and die 23 into contact with each other. Based on the distance between the initial position and each contact position in the four directions, controller 4 causes first drive mechanism 33 to move punch 13 or die 23 to the center position where central axis Cp of punch 13 and central axis Cd of die 23 are aligned with each other.

In addition, according to the adjustment method of punching device 100 of the present disclosure, controller 4 causes first drive mechanism 33 to bring punch 13 and die 23 into contact with each other by moving punch 13 or die 23 in the four orthogonal directions in the plane perpendicular to the punching direction from the initial position where punch 13 is inserted into punching die 23a. Based on the distance between the initial position and each contact position in the four directions, controller 4 causes first drive mechanism 33 to move punch 13 or die 23 to the center position where central axis Cp of punch 13 and central axis Cd of die 23 are aligned with each other.

Controller 4 can control first drive mechanism 33 to move punch 13 to the center position based on the contact position information of punch 13 and die 23, and can realize automatic tool position adjustment based on a quantitative positional relationship between punch 13 and die 23. Controller 4 can control and use first drive mechanism 33 and second drive mechanism 35 to move punch 13 to the center position based on the contact position of die 23 and punch 13, and can realize minute die adjustment in a micron unit or smaller without requiring a highly-skilled work level of a worker. Therefore, for example, even when a clearance is approximately 2 μm as in the punching in a thin material having the thickness of 30 μm or smaller, the tool position can be properly adjusted. Accordingly, improved quality and reduced man-hours for adjustment can be realized. Moreover, since the tool is prevented from being unevenly worn due to a clearance deviation, a life of the tool can be lengthened, and the tool can be stabilized.

As described above, the above-described exemplary embodiment has been described as an example of the technique disclosed in the present application. However, without being limited thereto, the technique in the present disclosure is also applicable to exemplary embodiments in which modifications, substitutions, additions, or omissions are appropriately made.

The adjustment device and the adjustment method of the punching device of the present disclosure can be used in adjusting the punching device that punches the workpiece into a predetermined shape by punching the workpiece placed on the die having the punching die with the punch.

What is claimed is:

1. An adjustment method of a punching device which punches a workpiece placed on a die having a punching die with a punch so that the workpiece is punched into a predetermined shape, the adjustment method comprising:
   transmitting, using a controller, drive information to each of a first drive mechanism and a second drive mechanism communicably connected to the punch and the die to move the punch or the die;
   receiving, using the controller, position information and load information from respective sensors communicably connected to the punch and the die, based on the moving the punch or the die;
   positioning the punch and the die in contact with each other based on the moving of the punch or the die using the controller communicably connected to the first and second drive mechanisms, the moving of the punch or die being performed in four different orthogonal directions in a plane perpendicular to a punching direction from an initial position where the punch is inserted into the punching die; and
   positioning the punch or the die to a center position where a central axis of the punch and a central axis of the die are aligned with each other using the controller communicably connected to the first and second drive mechanisms, based on a distance between the initial position and each contact position in the four different orthogonal directions.

* * * * *